C. G. SCHAMU.
BEEHIVE.
APPLICATION FILED MAY 1, 1912.
1,064,779.
Patented June 17, 1913.
2 SHEETS—SHEET 2.
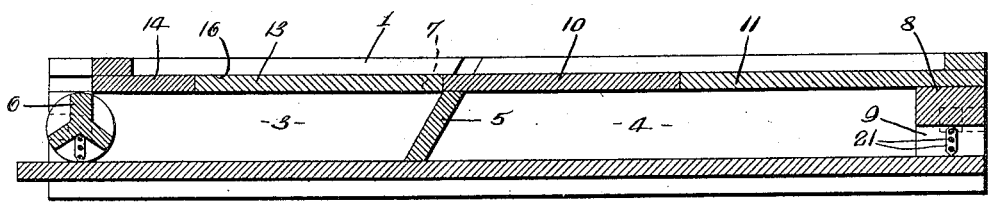
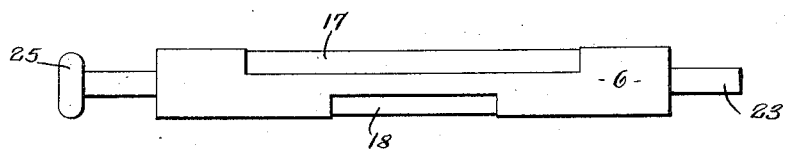
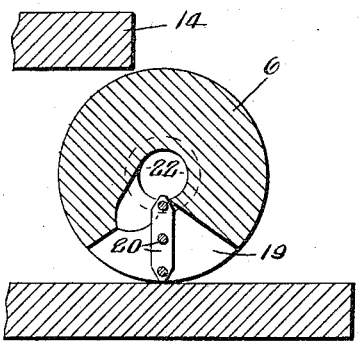 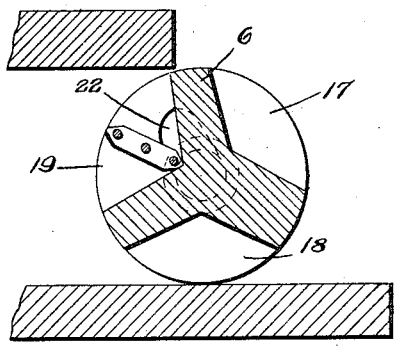
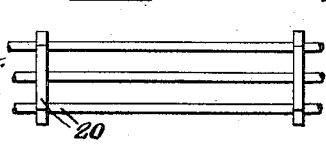 
WITNESSES:
Chas. H. Young.
S. Davis.
INVENTOR
Charles G. Schamu
BY
Parsons Axell Bodeer
ATTORNEYS

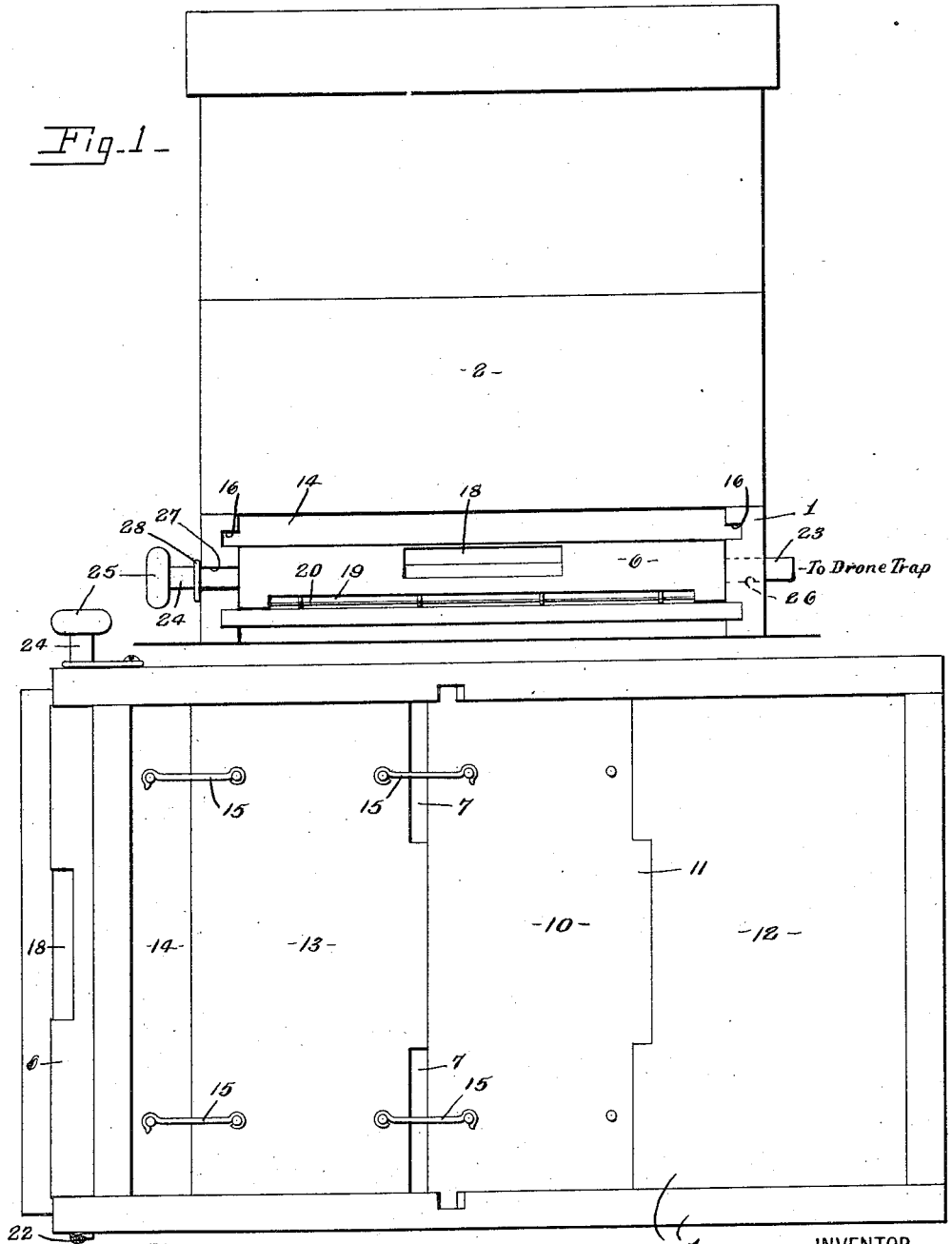

UNITED STATES PATENT OFFICE.

CHARLES G. SCHAMU, OF LIVERPOOL, NEW YORK.

BEEHIVE.

1,064,779.  Specification of Letters Patent.  Patented June 17, 1913.

Application filed May 1, 1912. Serial No. 694,411.

*To all whom it may concern:*

Be it known that I, CHARLES G. SCHAMU, of Liverpool, in the county of Onondaga and State of New York, have invented a certain new and useful Beehive, of which the following is a specification.

This invention relates to beehive structures and has for its object an adjustable gate for beehives, and also a base or bottom board therefor; and it consists in the combinations and constructions hereinafter set forth and claimed.

In describing this invention reference is had to the accompanying drawings in which like characters designate corresponding parts in all the views.

Figure 1 is a front elevation of a beehive embodying my invention. Fig. 2 is a plan of the base or bottom board of the beehive. Fig. 3 is a longitudinal sectional view through the bottom board or base. Figs. 4 and 5 are elevations of the detached gate. Figs. 6 and 7 are enlarged transverse sectional views on the planes of lines "A—A" and "B—B", Fig. 4, the gate being shown as adjusted in different open positions in said figures. Fig. 8 is a sectional view on line "B—B", Fig. 4, the gate being adjusted in its closed position. Fig. 9 is a fragmentary view of a drone trap net.

1 is the base or bottom board.

2 is the hive resting on the base or bottom board.

The base or bottom board, here illustrated, confines a closed compartment which is usually divided into two chambers 3, 4 by a transverse partition 5, Fig. 3.

6 is the main gate of the hive, the gate being arranged at one end of the chamber 3, the upper wall of which is formed with passages 7 through which the bees enter the hive 2 from the base.

8 is a closure for the chamber 4, the closure 8 having a transverse slot or passage 9 therethrough, and said closure 8 is adjustable in position to entirely close the chamber 4 or into the position shown in Fig. 3, in which the passage 9 communicates with the outer atmosphere. The closure 8 is operated for the purpose of changing the position of the slot 9, by removing the closure 8 bodily, turning the same until the slot is in the desired position and then placing the closure back in position in the base board. The closure 8 is provided with trunnions at its ends and said trunnions slide in open ended slots in the side walls of the base board, as indicated in dotted lines, Fig. 3. The closure is square so that it may be arranged either in the position shown in Fig. 3 or in such position that the slot 9 is out of position to establish communication with the chamber 4.

The upper wall of the chamber 4 is normally closed but includes a removable section 10 having a tongue 11 which interfits into a complemental cutout in the fixed section 12 of said wall, the section 10 being reversible in order to shift the interfitting means and form passages similar to the passages 7 by which the bees have access from the hive to the chamber 4.

The section 10 and also the sections 13 and 14 of the upper wall of the chamber 3 are detachably connected by suitable means as hooks 15, and the sections are slidable, as a unit, through the front end of the hive in ways 16 in the side walls of the base, said sectional wall being removable for the purpose of reversing the section 10 for forming or closing the passage 7 to the chamber 4. By reason of the sectional construction of the upper wall of the base, it can be removed, adjusted and replaced without disturbing the hive. The sectional wall may also be removed in order to give the hive a maximum ventilation. The passages 7 leading to the chamber 3 are formed between the sections 10, 13, and the section 13 may be reversed to change the position of said passage. If desired when wintering the bees, the section 13 may be removed to provide space for the dead bees which accumulate and frequently obstruct the air passages and cause suffocation of the remainder of the bees of the colony.

The closure 8 may be adjusted into the position shown in Fig. 3, for forming an extra entrance for the workers or may be positioned to entirely close the chamber 4, and said closure is removable without disturbing the hive for the purpose of placing food into the chamber 4 for stimulating the bees in early spring or late fall.

The gate 6 is formed with passages of different sizes to regulate the temperature at different seasons of the year and also to accommodate the different classes of bees, and is adjustable for bringing any one of the passages into effective position and the others out of effective position or, is adjustable to an entirely closed position so that none of the bees can leave the hive, as when moving the hives to other yards or in and out of cellars.

In the illustrated embodiment of my invention, the gate 6 is in the form of a roller or cylinder having a plurality of peripheral passages 17, 18 and 19, the passages 17 and 18 being of sufficient height or depth to permit the entrance and egress of all classes of bees in the hive, the passage 18 being merely shorter than the passage 17, so that when it is in operative position, the hive will not be open to the outer air to as great an extent as when the passage 17 is open. The temperature of the hive may thus be regulated by manipulating the gate.

The passage 19 is for the purpose of permitting the entrance and egress of the workers only and for this purpose is provided with a drone trap wire 20, which forms passages of less height than the passages 17, 18, but obviously the drone trap may be dispensed with and the passage 19 itself formed only of sufficient height or depth to accommodate only the workers.

As the drones congregate at the exit of the hive when they find that they cannot get out, and thus obstruct the workers from entering and leaving the hive, I have provided an emergency exit and entrance which in this embodiment of my invention is the passage 9 which is also provided with a drone trap 21, and in order to provide for the overflow of the drones, I have provided the gate 6 with an outlet large enough to permit the drones to pass through, this outlet being here shown as an axial passage 22 extending through one of the axles 23, 24 at opposite ends of the gate 6, the passage being formed in the axle 23 and opening into the passage 19 behind the drone trap 20, as seen in Figs. 6 and 7.

When desired the passage 22 may be closed by a plug as a common cork and when it is desired to separate the drones, the hollow axle may be connected to a suitable trap. If desired drone outlets may be provided at any other suitable points.

The gate 6 is adjusted by means of a handle 25 mounted on the axle 24 thereof. The axles 23 and 24 extend respectively into a bearing 26 and a slot 27, Fig. 1, in opposite sides of the bottom board or base, and the gate is held from removal by means of a hook or latch 28 coacting with the axle 24 and holding the axle from movement out of the slot 27.

In operation, the gate 6 may be turned into a position shown in Fig. 8, to entirely close the hive or may be turned into a position shown in Fig. 6 in which the queen and drones are held in the hive, or may be removed or detached from the base after the colony has settled down, and if it is desired to separate the drones, the passage 21 may be opened when the gate is in the position shown in Fig. 6, and such passage connected to a suitable drone trap. Thus by reason of the gate 6, any change can be made instantly and no attachments for the hive are necessary.

If it is desired to ventilate the hive, the upper sectional wall of the bottom board or base can be removed and the section 10 reversed and the closure placed in such position that the air can have free circulation through the passage 9, passages 7 between the sections 10 and 12, and the sections 10 and 13 and through the gate 6.

If it is desired to feed the bees, as in the spring of the year and late fall, the food can be placed in the chamber 4 by moving and replacing the closure 8 and reversing the section 10 to form passages 7 between the chamber 4 and the hive or the upper sectional wall may be removed to more thoroughly ventilate the hive, or when wintering the bees the section 13 may be entirely removed to provide room for the dead bees. The removing of the upper wall of the base can be effected instantly without disturbing the hive, by withdrawing the same from the front of the hive and making the desired changes and inserting the sections as a unit back into position.

What I claim is:

1. A beehive having a gate opening and a gate provided with an entrance and exit passage, the gate being adjustable to different positions whereby said passage partly opens the gate opening or whereby the gate opening is closed, substantially as and for the purpose described.

2. A beehive having a gate opening and an adjustable gate having a passage, the gate being movable about an axis to different positions for locating the passage to partly open the gate opening or for entirely closing said opening, substantially as and for the purpose specified.

3. An adjustable gate for beehives having passages of different sizes, the gate being adjustable for locating any one of the passages in effective position and removing the other passages out of effective position, substantially as and for the purpose described.

4. An adjustable gate for beehives having passages of different sizes, the gate being adjustable for locating any one of the passages in effective position and removing the other passages out of effective position, or for moving all of the passages out of effective position so that the gate is entirely closed, substantially as and for the purpose specified.

5. An adjustable gate for beehives having a passage of sufficient size to accommodate the workers only, another passage large enough to accommodate the drones and the queen, the gate being adjustable for locating any one of said passages in effective position and moving the others out of effective position, and the gate being also adjustable into an entirely closed position, substantially as and for the purpose set forth.

6. A gate for beehives having passages of different sizes therethrough, the gate being adjustable about an axis for bringing different passages into effective position or for positioning the gate in an entirely closed position, substantially as and for the purpose described.

7. A gate for beehives comprising a roller having transverse peripheral passages of different depths, the gate being adjustable about its axis, substantially as and for the purpose specified.

8. In a beehive, the combination with a base formed with an inclosed compartment; of a gate movable about an axis and being interposed between opposing walls of the compartment and having portions movable into positions contiguous to said walls for entirely closing the hive, the gate being formed with transverse passages of different sizes and being movable about its axis for bringing any one of the passages opposed to one of said walls or being adjustable for bringing closed portions thereof contiguous to both of said walls, substantially as and for the purpose set forth.

9. A beehive provided with a main passage for accommodating the workers only, and an auxiliary passage large enough to permit egress of the drones, the latter passage being adapted to be connected to a drone trap, substantially as and for the purpose described.

10. A beehive having a gate comprising a roller having a transverse peripheral passage for accommodating the workers only, and an axial passage large enough to permit exit of the drones, the latter being adapted to be connected to a drone trap, substantially as and for the purpose specified.

11. A base for beehives, the base being formed with a closed compartment having upper and lower walls, the upper wall being provided with a passage into the beehive, and an entrance and exit passage in one of the other walls of the compartment, substantially as and for the purpose set forth.

12. A base for beehives, the base being formed with a closed compartment, the upper wall of the compartment being slidable through one end of the base, and including sections detachably secured together, the sections having interfitting means at their abutting edges, and one of the sections being reversible for displacing the interfitting means and forming passages into the hive, substantially as and for the purpose described.

13. A base for beehives, the base being formed with a closed compartment having its upper wall provided with an opening into the beehive, the base being formed with a transverse partition dividing the compartment into two chambers, a main entrance for the bees opening into one chamber, and a removable closure at one end of the other chamber, substantially as and for the purpose specified.

14. A base for beehives formed with a compartment having an upper wall provided with a passage into the beehive, the base being formed with a transverse partition dividing the compartment into two chambers, a main entrance for the bees opening into one chamber and a removable closure at one end of the other chamber, the closure being formed with a transverse passage and being adjustable into position to entirely close said chamber or to position the passage to communicate with the outer atmosphere, substantially as and for the purpose set forth.

15. A base for beehives, the base being formed with front and rear chambers, one chamber having a gate for the bees and said chamber communicating with the interior of the hive box, and means whereby communication can be established and cut off between the other chamber and the hive boxes, the latter chamber also having a gate by which access is had to the same, substantially as and for the purpose set forth.

In testimony whereof, I have hereunto signed my name in the presence of two attesting witnesses, at Syracuse, in the county of Onondaga, in the State of New York, this 11th day of April, 1912.

CHARLES G. SCHAMU.

Witnesses:
S. Davis,
L. M. Davis.

Copies of this patent may be obtained for five cents each, by addressing the "Commissioner of Patents, Washington, D. C."